United States Patent [19]
Kazama et al.

[11] Patent Number: 5,883,668
[45] Date of Patent: Mar. 16, 1999

[54] SOLID-STATE IMAGE PICKUP APPARATUS

[75] Inventors: Satoshi Kazama; Tetsuo Nomoto, both of Tatsuno-machi; Shinichi Nakajima, Hachioji, all of Japan

[73] Assignee: Olympus Optical Co., Ltd., Tokyo, Japan

[21] Appl. No.: 752,599

[22] Filed: Nov. 19, 1996

[30] Foreign Application Priority Data

Dec. 5, 1995 [JP] Japan ................................. 7-339935

[51] Int. Cl.⁶ .................................................. H04N 3/14
[52] U.S. Cl. ............................ 348/303; 348/302; 348/294
[58] Field of Search ............................... 348/294, 295, 348/302, 303, 304, 305, 306, 307, 308, 309, 262, 264, 281; 250/208.1; 358/482, 483; 377/64, 67, 75, 76

[56] References Cited

U.S. PATENT DOCUMENTS

| | | | |
|---|---|---|---|
| 4,556,908 | 12/1985 | Ida | 348/302 |
| 4,648,105 | 3/1987 | Priebe et al. | 377/64 |
| 4,959,723 | 9/1990 | Hashimoto | 348/302 |
| 5,132,993 | 7/1992 | Nishiura et al. | 377/76 |
| 5,134,488 | 7/1992 | Sauer | 348/294 |
| 5,202,908 | 4/1993 | Hatada | 377/64 |
| 5,396,289 | 3/1995 | Nakamura | 348/294 |
| 5,714,752 | 2/1998 | Ueno et al. | 358/482 |

*Primary Examiner*—Wendy Garber
*Assistant Examiner*—Luong Nguyen
*Attorney, Agent, or Firm*—Armstrong, Westerman, Hattori, McLeland & Naughton

[57] ABSTRACT

A solid-state image pickup apparatus comprising a pixel array made up a plurality of pixels two-dimensionally arranged and horizontal and vertical scanning circuits, each scanning circuit having an arbitrary-pixel readout function of reading a pixel signal from an arbitrary area that is a portion of the effective pixel area of the pixel array, each scanning circuit comprising: a shift register comprising a plurality of shift register units that are cascaded; a memory unit constructed of a latch for storing the output of the shift register unit; a memory switch connected between the shift register unit and the input terminal of the memory unit; a transfer switch connected between the shift register unit and the output terminal of the memory unit. The memory switch is driven to store data at each shifter register unit onto the memory unit associated with each shift register unit after a shift pulse to be input to the shift register is shifted to the shift register unit at a predetermined position within a scan start position setting period prior to a scan. The transfer switch is driven to start the scan by transferring the data that the memory unit has stored within the scan start position setting period, to the shift register unit with which the memory unit is associated.

14 Claims, 13 Drawing Sheets

FIG.12

| (1,1) | (2,1) | (3,1) | (4,1) | (5,1) | (6,1) | (7,1) |
|---|---|---|---|---|---|---|
| (1,2) | (2,2) | (3,2) | (4,2) | (5,2) | (6,2) | (7,2) |
| (1,3) | (2,3) | (3,3) | (4,3) | (5,3) | (6,3) | (7,3) |
| (1,4) | (2,4) | (3,4) | (4,4) | (5,4) | (6,4) | (7,4) |
| (1,5) | (2,5) | (3,5) | (4,5) | (5,5) | (6,5) | (7,5) |
| (1,6) | (2,6) | (3,6) | (4,6) | (5,6) | (6,6) | (7,6) |
| (1,7) | (2,7) | (3,7) | (4,7) | (5,7) | (6,7) | (7,7) |

SOLID-STATE IMAGE PICKUP APPARATUS

BACKGROUND OF THE INVENTION

1. Field of the Invention

The present invention relates to a solid-state image pickup apparatus that is capable of reading out an output from a light receiving pixel in a given area on the light receiving surface of the pickup apparatus.

2. Description of the Related Art

A solid-state image pickup apparatus capable of reading a light receiving pixel in a given area on the light receiving surface is disclosed, for example, in Japanese Unexamined Patent Publication No. 4-277985. In this disclosure, a shift register constituting scan means for sequentially reading out the output from each light receiving pixel is divided into a plurality of blocks, and the output from the light receiving pixels corresponding to a divided block is read. In this method, however, the unit of repetition of the shift register is the divided block. The quality of the signal derived from the border between blocks may suffer variations. The selection of the area to be read is possible only by the unit of block that is predetermined at the stage of fabrication of the solid-state image pickup apparatus. Therefore, it is impossible to readout an output from a light receiving pixel in an arbitrary area on the light receiving surface.

The inventors of this invention have proposed a scanning circuit in Japanese Unexamined Patent Publication No. 6-35093 which resolves the above problems. FIG. 1 is the schematic diagram of that scanning circuit. The constitution of this scanning circuit is first discussed. Designated 101 is a shift register unit constructed of a first clocked inverter 101-1 and a second clocked inverter 101-2 cascaded, and a shift register is constructed of a plurality of shift register units cascaded. There are shown further a memory switch 102, a transfer switch 103, and a memory unit 104 constructed of a first inverter 104-1 and a second inverter 104-2 in series connection. The output node of the first clocked inverter 101-1 is connected to one terminal of the memory switch 102 and one terminal of the transfer switch 103. The other terminal of the memory switch 102 is connected to the input terminal of the first inverter 104-1 of the memory unit 104. The output terminal of the second inverter 104-2 of the memory unit 104 is connected to the other terminal of the transfer switch 103. A plurality of unit stages 106 of the scanning circuit are cascaded to form the scanning circuit. FIG. 1 shows the scanning circuit that is made up of 7 unit stages. The scanning circuit in the solid-state image pickup apparatus includes a lot more unit stages in practice.

The first clocked inverter 101-1 becomes active when a driving clock $\phi 2$ is at a high level, and the second clocked inverter 101-2 becomes active when a driving clock $\phi 1$ is at a high level. An input clock $\phi ST$ is fed to the input terminal of the shift register unit 101 at the first unit stage. The memory switch 102 goes conductive when a clock $\phi TBA$ is at a high level, and the transfer switch 103 goes conductive when a clock $\phi LD$ is at a high level.

As can be seen from the timing diagram in FIG. 4 that will be referred to for the description of the operation of an embodiment 1 of the present invention, the scanning circuit thus constructed sequentially transfers the clock $\phi ST$ to nodes SR 1.0, SR 2.0, SR 3.0, SR 4.0, SR 5.0. SR 6.0, and SR 7.0 in synchronism with the clocks $\phi 1$ and $\phi 2$ when the clocks $\phi 1$ and $\phi 2$ and clock $\phi ST$ are fed with the clocks $\phi TBA$ and $\phi LD$ kept at a low level. Also as can be seen from the timing diagram in FIG. 5 in connection with the operation of the embodiment 1, a level at each of nodes SR 0.5, SR 1.5, SR 1.5 and SR 3.5 is stored at memory units 104 by driving the clock $\phi TBA$ high at the same timing as the clock $\phi 2$ at time $t_{TB}$.

By driving the clock $\phi LD$ high at the same timing as the clock $\phi 1$ at time $t_{LD}$, levels stored at time $t_{TB}$ are transferred to nodes SR 0.5, SR 1.5, SR 2.5, and SR 3.5. Since the clock $\phi 1$ is high level, the signals at nodes SR 0.5, SR 1.5, SR 2.5, SR 3.5, SR 4.5, SR 5.5, and SR 6.5 are output in their inverted forms to nodes SR 1.0, SR 2.0, SR 3.0, SR 4.0, SR 5.0, SR 6.0, and SR 7.0, respectively. The high level input of $\phi ST$ that has been fed at time $t_{ST}$ sequentially appears at SR 3.0 and subsequent nodes from time $t_{LD}$ thereafter. This means that the scanning of the shift register starts at node SR 3.0.

The disadvantage of the scanning circuit in FIG. 1 is now discussed. The memory unit 104 in the scanning circuit in FIG. 1 is constructed of inverters only. When the memory switch 102 remains nonconductive for a long period of time, the potential (voltage) at the input terminal of the inverter 104-1 becomes unstable due to leaks or other causes. If the voltage shifts to an intermediate level between a power supply voltage VDD and VSS, a current flows through the inverter 104-1 increasing power consumption. Since the voltage at the output of the inverter 104-1 remains unstable, the inverter 104-2 also behaves in a similar fashion. When under such a condition, data is transferred to the shift register unit 101 from the memory unit 104, data different from the original data stored in the memory unit 104 can be transferred to the shift register unit 101, and the shift register can malfunction.

When the readout of the signal starts at an arbitrary position and ends at another arbitrary position, OB (optical black) clamping is rendered inoperable if a light shielding pixel is not included within the range of the signal readout. Thus, a reliable image pickup operation cannot be executed.

SUMMARY OF THE INVENTION

The present invention has been developed to resolve the above problems, which are also associated with the scanning circuit disclosed in Japanese Unexamined Patent Publication 6-350933 filed by the inventors of this invention. It is an principal object of the present invention to provide a solid-state image pickup apparatus that reads a pixel signal accurately and easily for a long period of time from the same given area that is a portion of an effective pixel surface.

The XY-address solid-state image pickup apparatus of the present invention comprises a pixel array made up a plurality of pixels two-dimensionally arranged and horizontal and vertical scanning circuits, each scanning circuit having an arbitrary-pixel readout function of reading a pixel signal from an arbitrary area that is a portion of the effective pixel area of the pixel array, said each scanning circuit comprising: a shift register comprising a plurality of shift register units that are cascaded in a manner that data is transferred therethrough by a clock; a memory unit constructed of a latch for storing the output of the shift register unit; a memory switch connected between the shift register unit and the input terminal of the memory unit; a transfer switch connected between the shift register unit and the output terminal of the memory unit; and switch driving means for driving the memory switch to store data at each shifter register unit onto the memory unit associated with said each shift register unit after a shift pulse to be input to the shift register is shifted to the shift register unit at a predetermined position during a scan start position setting period prior to a scan and for driving the transfer switch to start the scan by transferring the data that the memory unit has stored during the scan start position setting period, to the shift register unit with which the memory unit is associated.

Correct data is transferred to the shift register unit by constructing the memory unit for storing the output of the shift register unit, of a latch. A pixel signal is thus stably read out from the same arbitrary area for a long period of time. The above object is thus achieved.

It is another object of the present invention to provide a solid-state image pickup apparatus that reads out the output from a light shielding pixel continuously and performs OB clamping in a reliable fashion when a pixel signal is read out from an arbitrary area that is a portion of the effective pixel surface of the pixel array.

The pixel array comprises light shielding pixels at least in part of the periphery portion of said pixel array, and each scanning circuit is designed to read one or more rows of light shielding pixels prior to or in succession to the readout of the pixel signal from the arbitrary pixel. The above object is thus achieved.

BRIEF DESCRIPTION OF THE DRAWINGS

FIG. 12 shows the scan area of pixels in the solid-state image pickup apparatus of FIG. 11.

DESCRIPTION OF THE PREFERRED EMBODIMENTS

Figure 1:
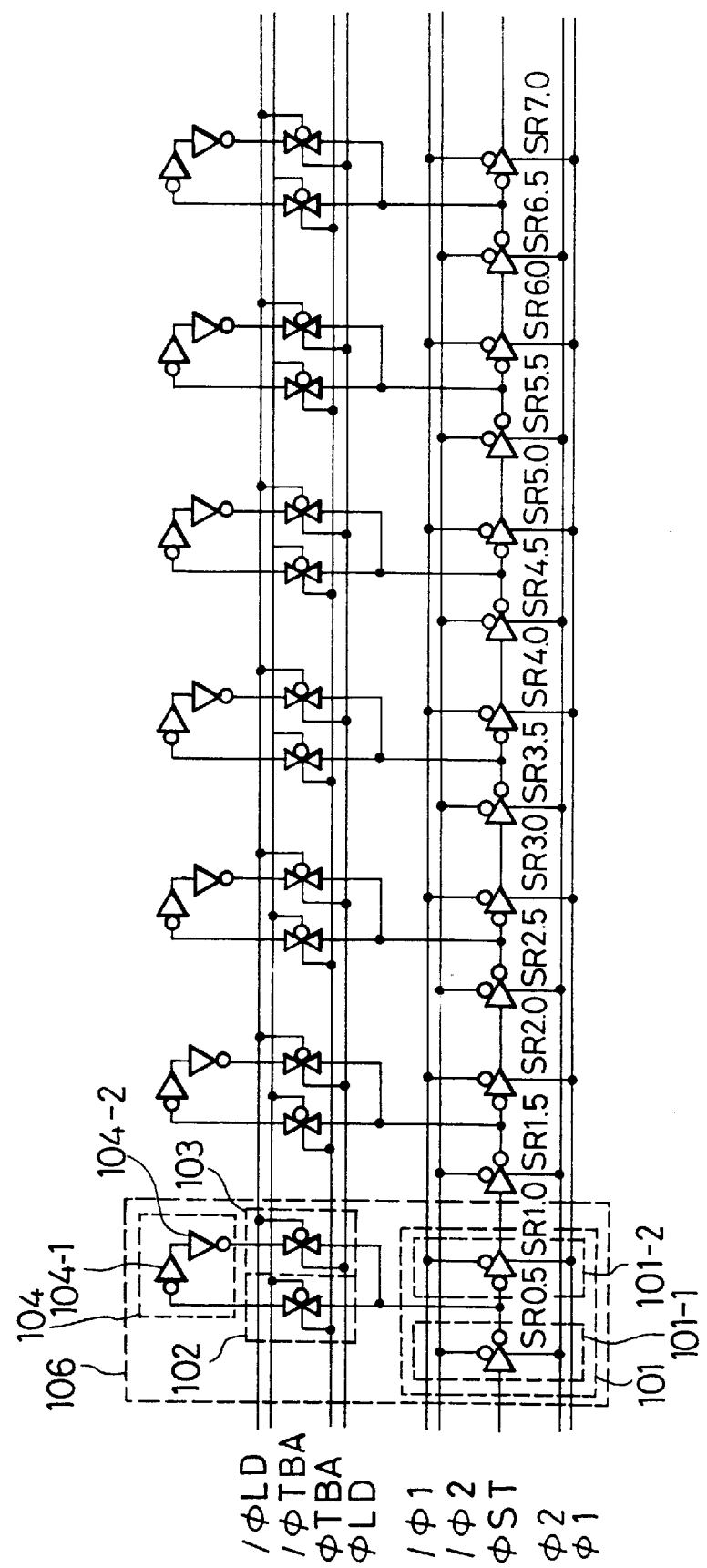
FIG. 1 is the schematic diagram of the scanning circuit which has already been proposed by the inventors of the present invention.
Figure 2:
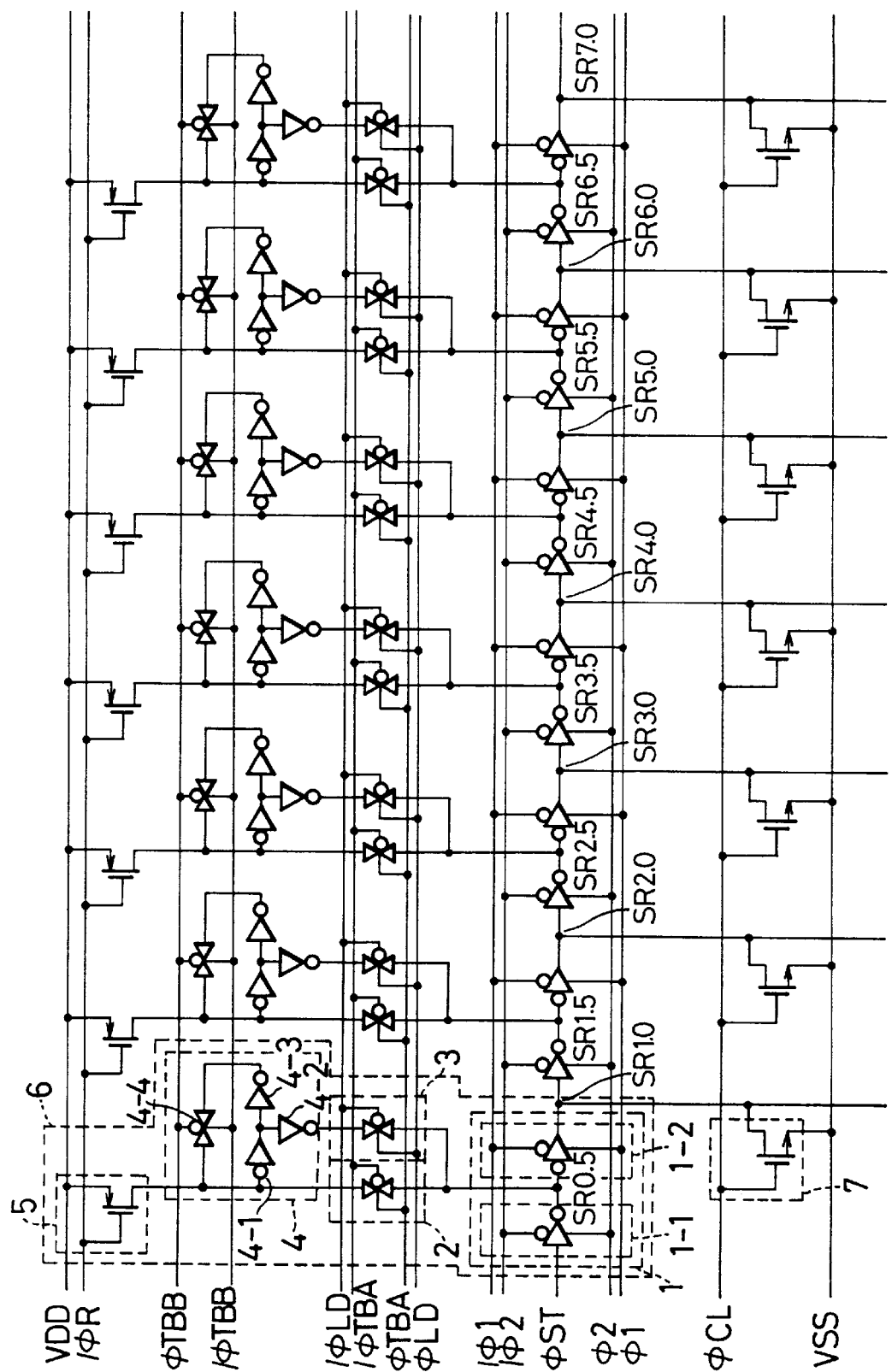
FIG. 2 is a schematic diagram of the scanning circuit in an embodiment 1 of the solid-state image pickup apparatus of the present invention.

The embodiments of the present invention are now discussed. FIG. 2 is the schematic diagram of the scanning circuit in the embodiment 1 of the solid-state image pickup apparatus of the present invention. Designated 1 is a shift register unit constructed of a first clocked inverter 1-1 and a second clocked inverter 1-2 cascaded, and a plurality of shift register units cascaded forms a shift register. An analog switch 2 is a memory switch that turns conductive when a clock $\phi$TBA is high. An analog switch 3 is a transfer switch that turns conductive when a clock $\phi$LD is high. One terminal of each switch is connected to the output terminal of the first clocked inverter 1-1.

A memory unit 4 is constructed of first, second and third inverters 4-1, 4-2, 4-3 and a switch 4-4 for latching that is an analog switch. The output terminal of the first inverter 4-1 is connected to the input terminals of the second inverter 4-2 and third inverter 4-3. A switch 4-4 for latching is connected between the output terminal of the third inverter 4-3 and the input terminal of the first inverter 4-1. The input terminal of the first inverter 4-1 is connected to the other terminal of the memory switch 2, and the output terminal of the second inverter 4-2 is connected to the other terminal of the transfer switch 3. The switch 4-4 for latching is designed to be conductive when a clock $\phi$TBB is low.

A reset switch 5 is connected between the input terminal of the first inverter 4-1 and one power supply VDD, and is designed to be conductive when a clock/$\phi$R (inverted $\phi$R) is low. A clear switch 7 is connected between the output terminal of the second clocked inverter 1-2 and other power supply VSS. The clear switch is described in detail in Japanese Unexamined Patent Publication 6-338198. Designated 6 is an unit stage of the scanning circuit. FIG. 2 shows the scanning circuit made up of 7 unit stages. In actual solid-state image pickup apparatuses, a lot more unit stages are employed.

The analog switch constituting each switch shown in FIG. 2 is constructed of an n-channel MOS transistor QA1 and a p-channel MOS transistor QA2 with drain to drain connected and source to source connected. A clock $\phi$1 is fed to the gate of the n-channel MOS transistor QA1 and a clock/$\phi$ (inverted $\phi$) is fed to the gate of the p-channel MOS transistor QA2.

Figure 3A:
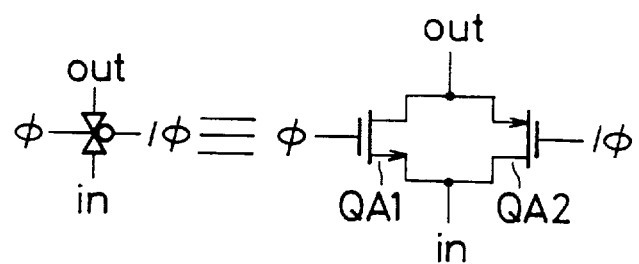
FIGS. 3A and 3B are schematic diagrams of each switch and shift register unit used in the scanning circuit of FIG. 2.
Figure 3B:
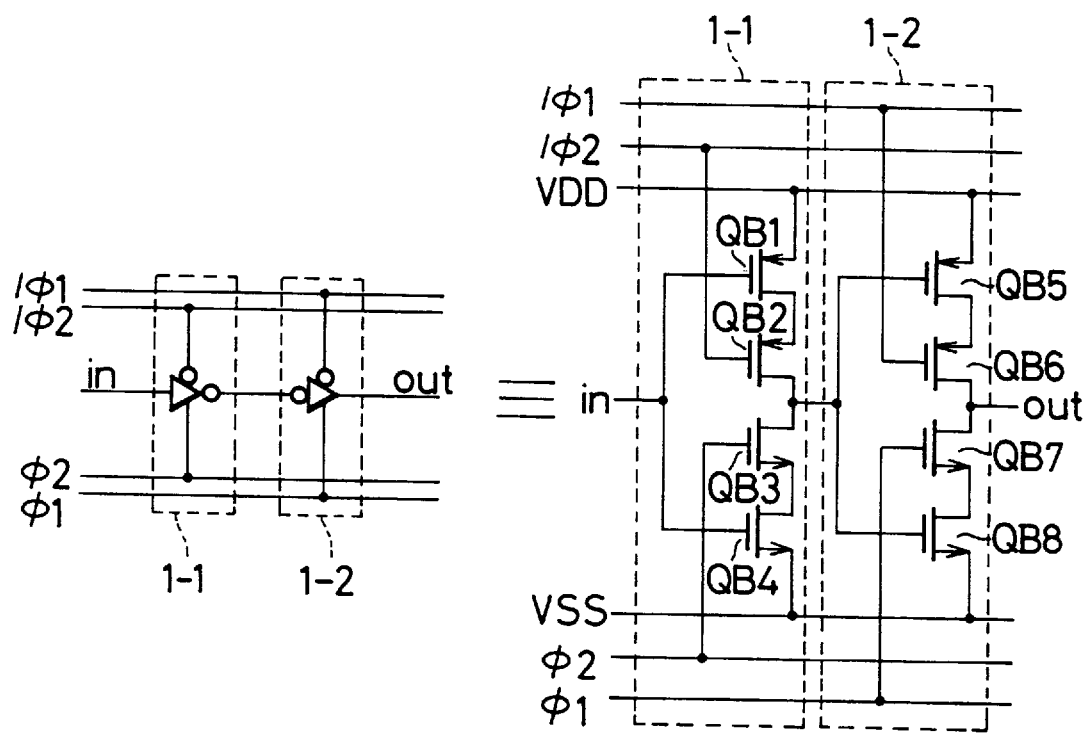

FIG. 3B shows specifically the organization of the shift register unit 1. The first clocked inverter 1-1 constituting the shift register unit 1 is constructed of p-channel MOS transistors QB1 and QB2, and n-channel MOS transistors QB3 and QB4 connected in series between VDD and VSS, with the gates of QB1 and QB4 serving as an input terminal and with the drains of QB2 and QB3 serving as an output terminal. A clock/$\phi$2 (inverted $\phi$2) is fed to the gate of the MOS transistor QB2 and a clock $\phi$2 is fed to the gate of the MOS transistor QB3. As shown in FIG. 3B, in the same way as the first clocked inverter 1-1, the second clocked inverter 1-2 is constructed of p-channel MOS transistors QB5 and QB6, and n-channel MOS transistors QB7 and QB8, with the clock/$\phi$1 (inverted $\phi$1) fed to the gate of the MOS transistor QB6 and the clock $\phi$1 fed to the gate of the MOS transistor QB7.

Figure 4:
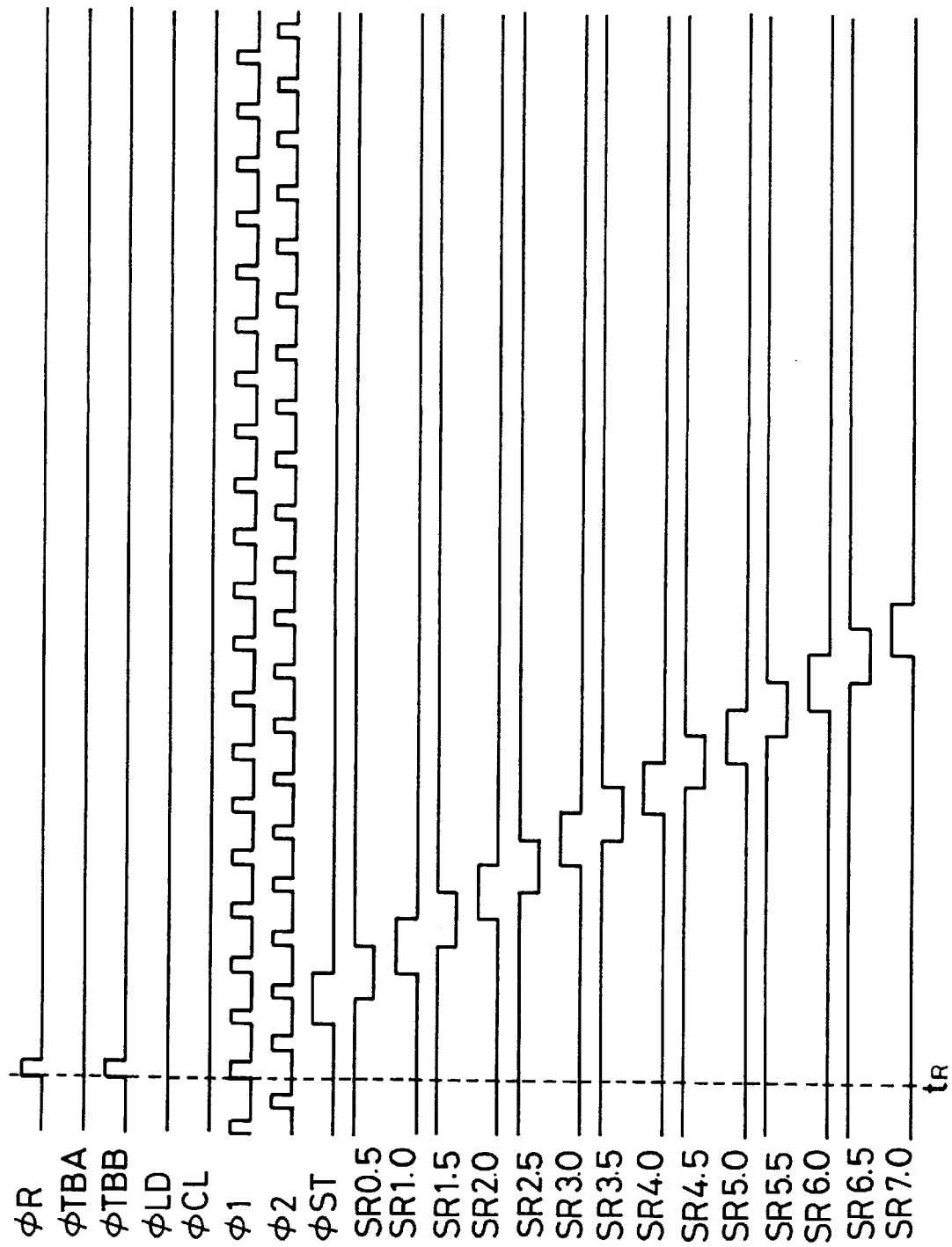
FIG. 4 is a timing diagram illustrating the normal scanning operation of the scanning circuit of FIG. 2.

Now discussed referring to the timing diagram in FIG. 4 is the normal scanning operation of the scanning circuit in FIG. 2. Prior to the normal scan, the clocks $\phi$TBB and $\phi$R are driven high at time $t_R$ with clocks $\phi$TBA and $\phi$LD at a low level. The reset switch 5 becomes conductive, the input terminal of the first inverter 4-1 turns high, and data stored at all memory units 4 are reset to be high level. In the normal scanning operation thereafter, clocks $\phi$R, $\phi$TBA, $\phi$TBB, and $\phi$LD go low level. The memory switch 2 and transfer switch 3 thus become nonconductive, and each shift register unit 1 is isolated from its associated memory unit 4. The scanning circuit thus operates in the same manner as the normal shift register that is constructed of clocked inverters cascaded. All memory units 4 stores a high level. If the reset switch is constructed of an n-channel MOS transistor connected between the input terminal of the first inverter and VSS and driven by the clock φR, the memory units store a low level.

When the input clock φST in synchronism with the rising edge of the clock φ1 is fed to the shift register unit 1 at the first stage, the input clock φST is sequentially transferred to nodes SR 1.0, SR 2.0, SR 3.0, SR 4.0, . . . in synchronism with clocks φ1 and φ2. The signal appearing at each of the nodes SR 1.0, SR 2.0, SR 3.0, SR 4.0, SR 5.0, SR 6.0, and SR 7.0 is used as a selection signal. The pixels of the pixel array are thus sequentially selected.

Figure 5:
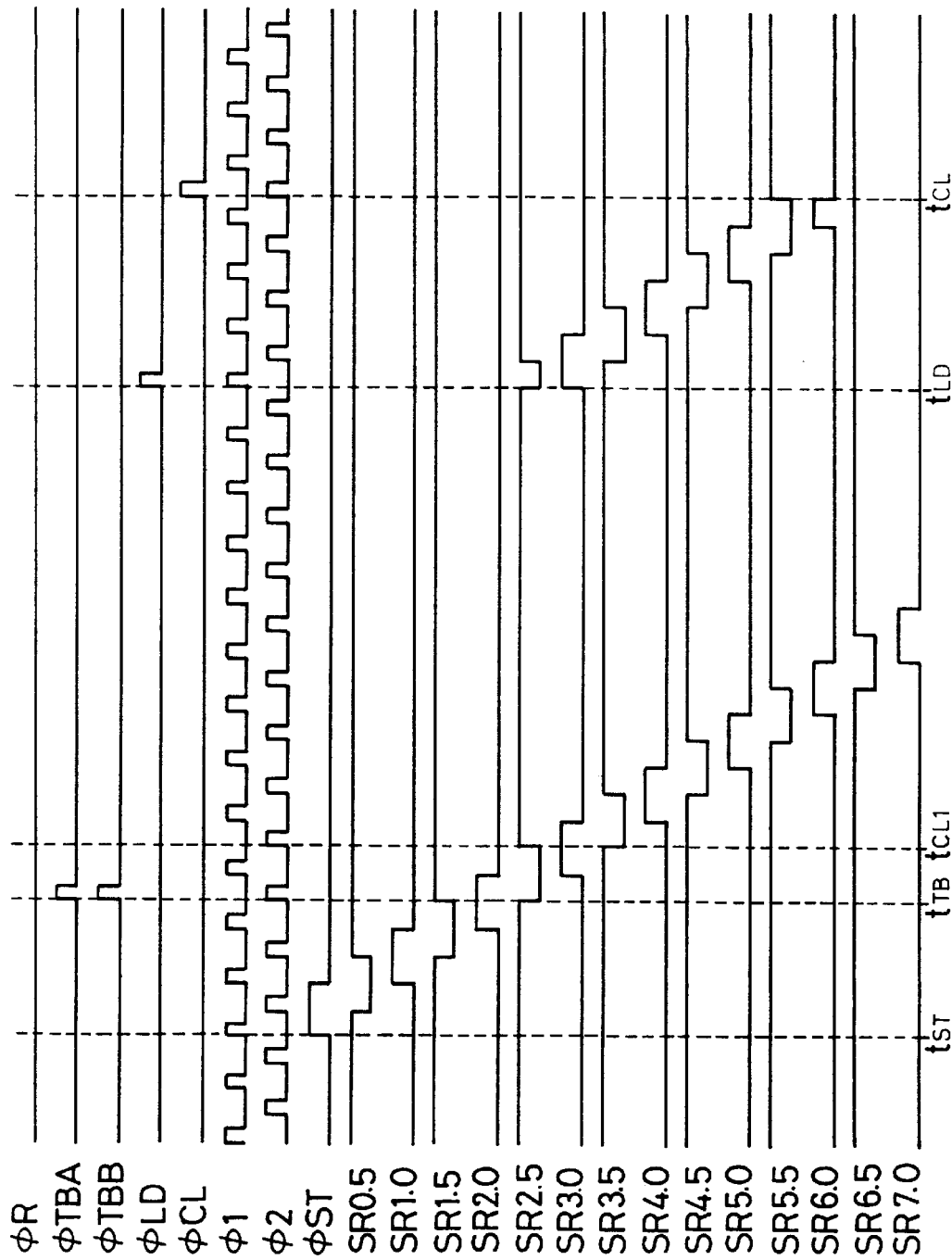
FIG. 5 is a timing diagram illustrating the operation of the scanning circuit of FIG. 2 which outputs a selection signal within an arbitrary scan area.

FIG. 5 is the timing diagram illustrating the operation of the scanning circuit, in which third, fourth and fifth unit stages out of the seven unit stages are a selected scan area. The start pulse φST is fed to the input terminal of the shift register unit 1 at the first unit stage at time $t_{ST}$. At time $t_{TB}$, clocks φTBA and φTBB are driven high level in synchronism with the high level of the clock φ2. The switches 4-4 for latching become nonconductive, and the memory switches 2 become conductive, causing data at each of nodes SR 0.5, SR 1.5, SR 2.5, SR 3.5, SR 4.5, SR 5.5, and SR 6.5 to be transferred to the input terminal of the associated memory unit 4. Thus, the memory units 4 associated with the first through seventh unit stages store H (for a high level), H, L (for a low level), H, H, H, and H, respectively.

When clocks φTBA and φTBB turn low afterwards, the memory switches 2 become nonconductive, and the switches 4-4 for latching become conductive. The input terminals of the memory units 4 are isolated from the respective nodes SR 0.5, SR 1.5, SR 2.5, SR 3.5, SR 4.5, SR 5.5, and SR 6.5, data fed to the memory units 4 are latched, and continuously stored there until new data are fed from nodes SR 0.5, SR 1.5, SR 2.5, SR 3.5, SR 4.5, SR 5.5, and SR 6.5 to the respective memory units 4. This concludes the scan start position setting operation.

At time $t_{LD}$ afterwards, the clock φLD is driven high in synchronism with the high level of the clock φ1. The transfer switches 3 become conductive, and data H, H, L, H, H, H, and H, stored in the memory units 4 associated with the shift register units 1 are transferred to nodes SR 0.5, SR 1.5, SR 2.5, SR 3.5, SR 4.5, SR 5.5, and SR 6.5, respectively. Since the clock φ1 is high level, the second clocked inverters 1-2 turn active, the signal at each of nodes SR 0.5, SR 1.5, SR 2.5, SR 3.5, SR 4.5, SR 5.5, and SR 6.5 is transferred in an inverted form to nodes SR 1.0, SR 2.0, SR 3.0, SR 4.0, SR 5.0, SR 6.0, and SR 7.0, respectively.

At time $t_{LD}$, a selection signal thus appears at node SR 3.0, and is sequentially transferred to nodes SR 4.0 and then SR 5.0. At time $t_{CL}$, a clock φCL is driven high level in synchronism with the high level of the clock φ2. This causes the clear switches 7 to be conductive, driving low the nodes SR 1.0, SR 2.0, SR 3.0, SR 4.0, SR 5.0, SR 6.0, and SR 7.0. No selection signal is transferred any more thereafter. In this way, from time $t_{LD}$, the selection signal is outputted from the nodes SR 3.0, SR 4.0, and SR 5.0 only.

In the above operation, if the clock φCL is driven high level in synchronism with the high level of the clock φ2 at time $t_{CL1}$ one period of the clock φ2 after $t_{TB}$, the clear switches 7 become conductive. Nodes SR 1.0, SR 2.0, SR 3.0, SR 4.0, SR 5.0, SR 6.0, and SR 7.0 are driven low level, no selection signal is transmitted any more thereafter, and thus the scan start position setting period is shortened. Clocks φR, φTBA, φTBB, φLD, and φCL remain low level unless otherwise specifically noted.

In the above discussion, the selection signal is picked up from third, fourth and fifth unit stages out of the seven unit stage scanning circuit. By changing the timings of the high levels of clocks φTBA, φTBB and φCL, the scan start and stop positions are arbitrarily set so that the selection signal is outputted within the arbitrary area of the pixel array.

The scanning circuit thus constructed can start scanning at an arbitrary position. The memory unit is constructed of a latch; thus, once data is stored in the memory unit, the data is continuously held there until the data is updated. The shift register units, switches and memory units are not limited to those described herein. Any other equivalent components are acceptable as long as they equally work.

Figure 6:
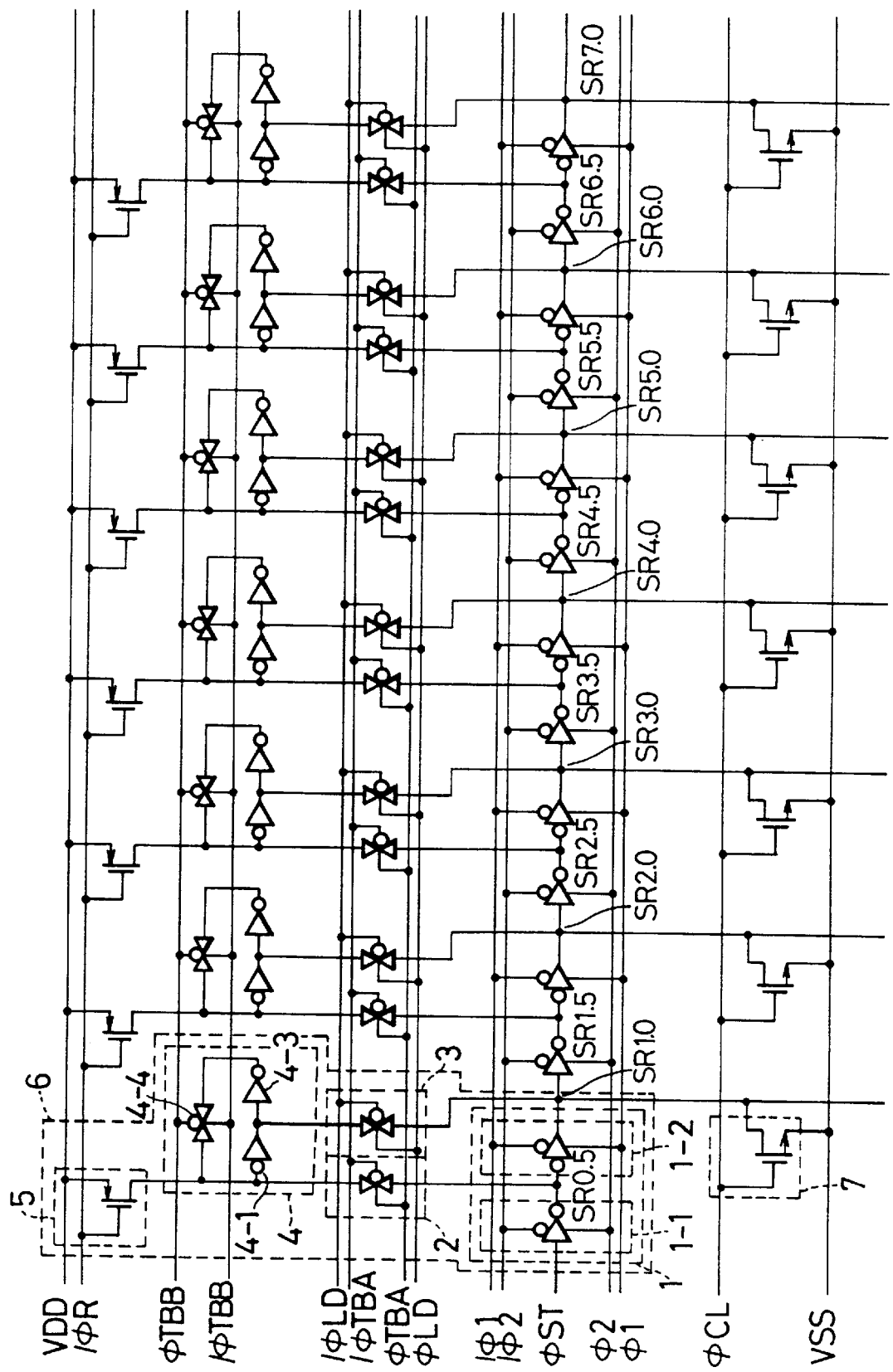
FIG. 6 is a schematic diagram of the scanning circuit in an embodiment 2.

The embodiment 2 is now discussed. FIG. 6 is the schematic diagram of the embodiment 2. Components equivalent to those with reference to FIG. 2 are designated with the same reference numerals. The embodiment 2 of the scanning circuit is different from the embodiment 1 in the organization of the memory unit 4 and the configuration of the transfer switch 3. The memory unit 4 in the embodiment 2 has no second inverter 4-2. One terminal of the transfer switch 3 is connected to the output terminal of the first clocked inverter 4-1 at the memory unit 4, and the other terminal is the transfer switch 3 is connected to the output terminal of the second clocked inverter 1-2. Like the embodiment 1, the embodiment 2 is a scanning circuit constructed of seven unit stages.

Figure 7:
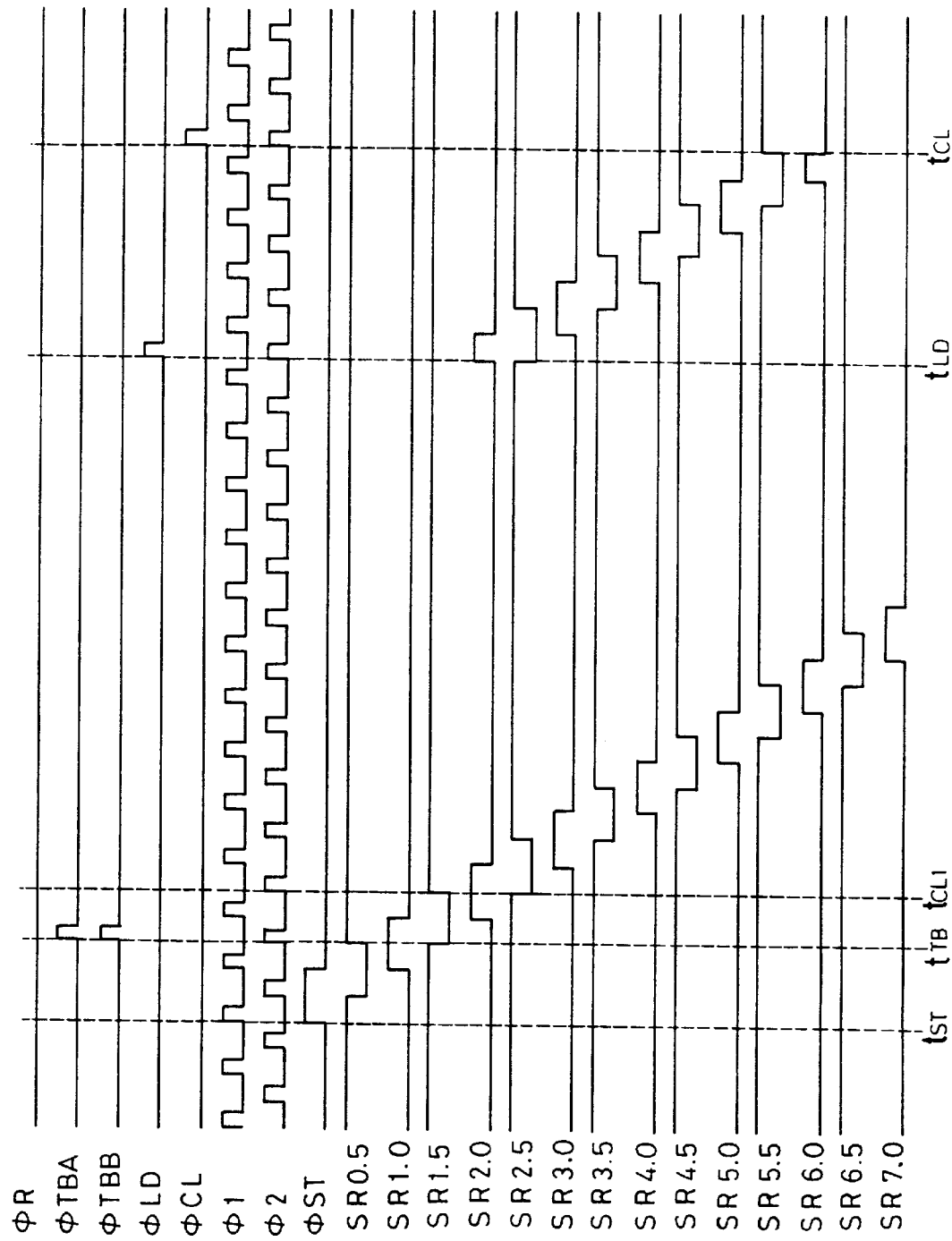
FIG. 7 is a timing diagram illustrating the operation of the scanning circuit of FIG. 6 which outputs a selection signal within an arbitrary scan area.

The normal scanning operation of the scanning circuit of the embodiment 2 remains unchanged from that of the embodiment 1. Referring to the timing diagram in FIG. 7, the scanning operation for selecting the area of third, fourth and fifth unit stages is now discussed. The start pulse φST is fed to the input terminal of the shift register unit 1 at the first unit stage at time $t_{ST}$. At time $t_{TB}$, clocks φTBA and φTBB are driven high level in synchronism with the high level of clock φ2. This causes the switches 4-4 for latching to be nonconductive, the memory switches 2 become conductive, and data at each of the nodes SR 0.5, SR 1.5, SR 2.5, SR 3.5, SR 4.5, SR 5.5, and SR 6.5 is transferred to the input terminal of the respective memory unit 4. The memory units 4 respectively associated with the first to seventh unit stages receive H (for a high level), L (for low level), H, H, H, H, and H, respectively.

When clocks φTBA and φTBB turn low level afterwards, the memory switches 2 become nonconductive, and the switches 4-4 for latching become conductive. The input terminals of the memory units 4 are isolated from the respective nodes SR 0.5, SR 1.5, SR 2.5, SR 3.5, SR 4.5, SR 5.5, and SR 6.5, data fed to the memory units 4 are latched, and continuously stored there until new data are fed from nodes SR 0.5, SR 1.5, SR 2.5, SR 3.5, SR 4.5, SR 5.5, and SR 6.5 to the respective memory units 4. This concludes the scan start position setting operation.

At time $t_{LD}$ afterwards, the clock φLD is driven high level in synchronism with the high level of the clock φ2. The transfer switches 3 thus become conductive, and data H, L, H, H, H, H, and H, stored in the memory units 4 associated with the shift register units 1 are transferred in their inverted forms to nodes SR 1.0, SR 2.0, SR 3.0, SR 4.0, SR 5.0, SR 6.0, and SR 7.0. Since the clock φ2 is high level, the first clocked inverters 1-1 becomes active, and H, H, L, H, H, H, and H are transferred to nodes SR 0.5, SR 1.5, SR 2.5, SR 3.5, SR 4.5, SR 5.5, and SR 6.5, respectively.

After a half period of the clock φ1 from time $t_{LD}$, a selection signal appears at node SR 3.0, and is sequentially transferred to nodes SR 4.0 and then SR 5.0. At time $t_{CL}$, a clock φCL is driven high level in synchronism with the high level of the clock φ2. This causes the clear switches 7 to be conductive, driving low level the nodes SR 1.0, SR 2.0, SR 3.0, SR 4.0, SR 5.0, SR 6.0, and SR 7.0. No selection signal is transferred any more thereafter. In this way, from time $t_{LD}$, the selection signal is outputted from the nodes SR 3.0, SR 4.0, and SR 5.0 only.

In the above operation, if the clock φCL is driven high level in synchronism with the high level of the clock φ2 at time $t_{CL1}$ one period of the clock φ2 after $t_{TB}$, the clear switches 7 become conductive. Nodes SR 1.0, SR 2.0, SR 3.0, SR 4.0, SR 5.0, SR 6.0, and SR 7.0 are driven low level, no selection signal is transmitted any more thereafter, and thus the scan start position setting period is shortened. Clocks φR, φTBA, φTBB, φLD, and φCL remain low level unless otherwise specifically noted.

In the above discussion, the selection signal is picked up from third, fourth and fifth unit stages out of the seven unit stage scanning circuit. By changing the timings of the high levels of clocks φTBA, φTBB and φCL, the scan start and stop positions are arbitrarily set so that the selection signal is outputted within the arbitrary scan area of the pixel array.

Compared with the embodiment 1, this embodiment realizes a scanning circuit capable of starting scanning at an arbitrary position, with its small component count, and the small component count helps improve the production yield of the apparatus.

Figure 8:
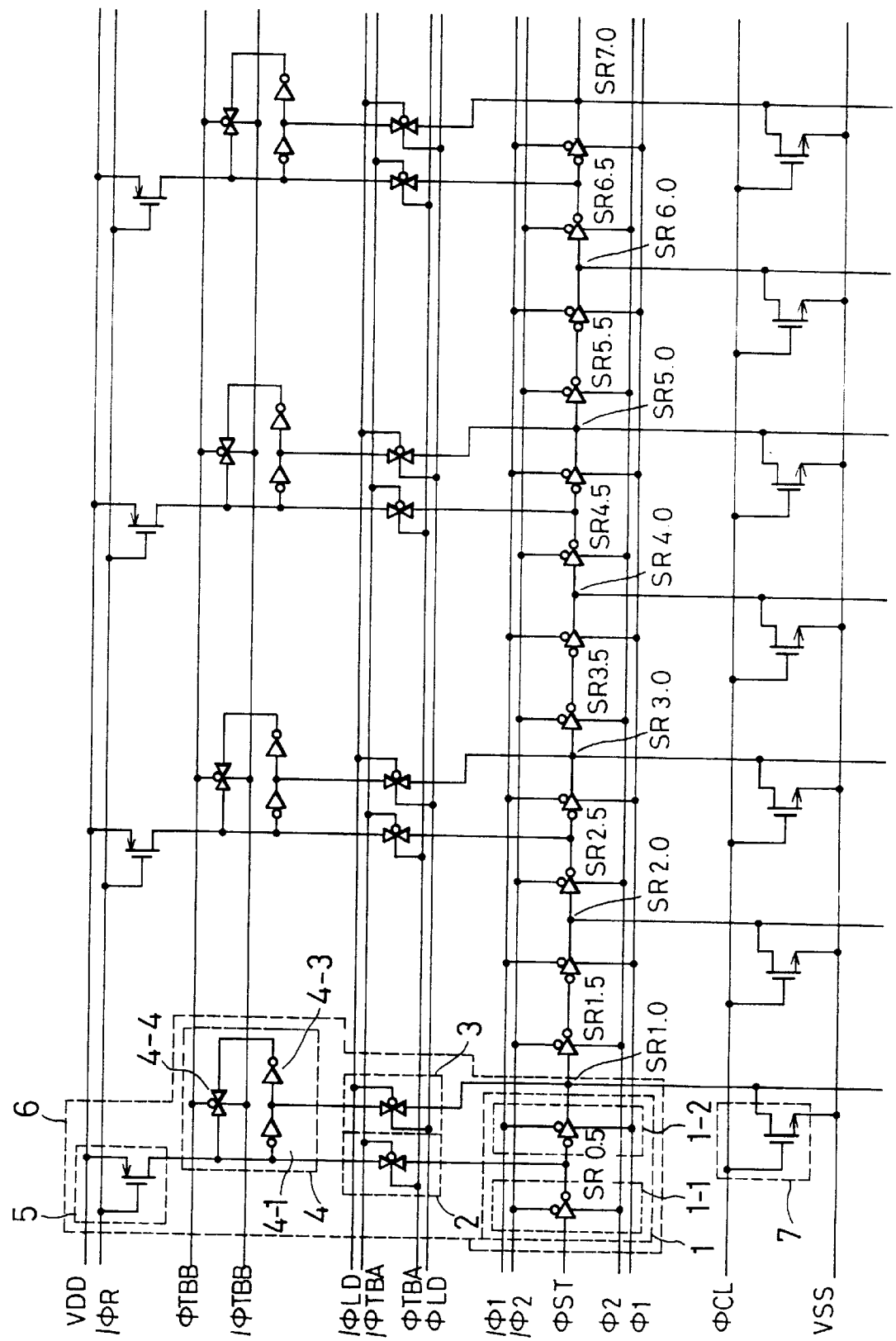
FIG. 8 is a schematic diagram of a modification of the scanning circuit of FIG. 6.

In the scanning circuit in the embodiment 2 shown in FIG. 6, the memory switches 2, transfer switches 3, memory units 4 and reset switches 5 may be arranged on the basis of a plurality of shift register units rather than on the basis of a single register unit. One modification of the scanning circuit in the embodiment 2 is now discussed. FIG. 8 shows the modification, in which a set of these component is arranged on every two shift register units. In the modification, each of the nodes SR 1.5, SR 2.0, SR 3.5, SR 4.0, SR 5.5, and SR 6.0 has no associated set of a memory switch 2, transfer switch 3, memory unit 4 and reset switch 5.

Figure 9:
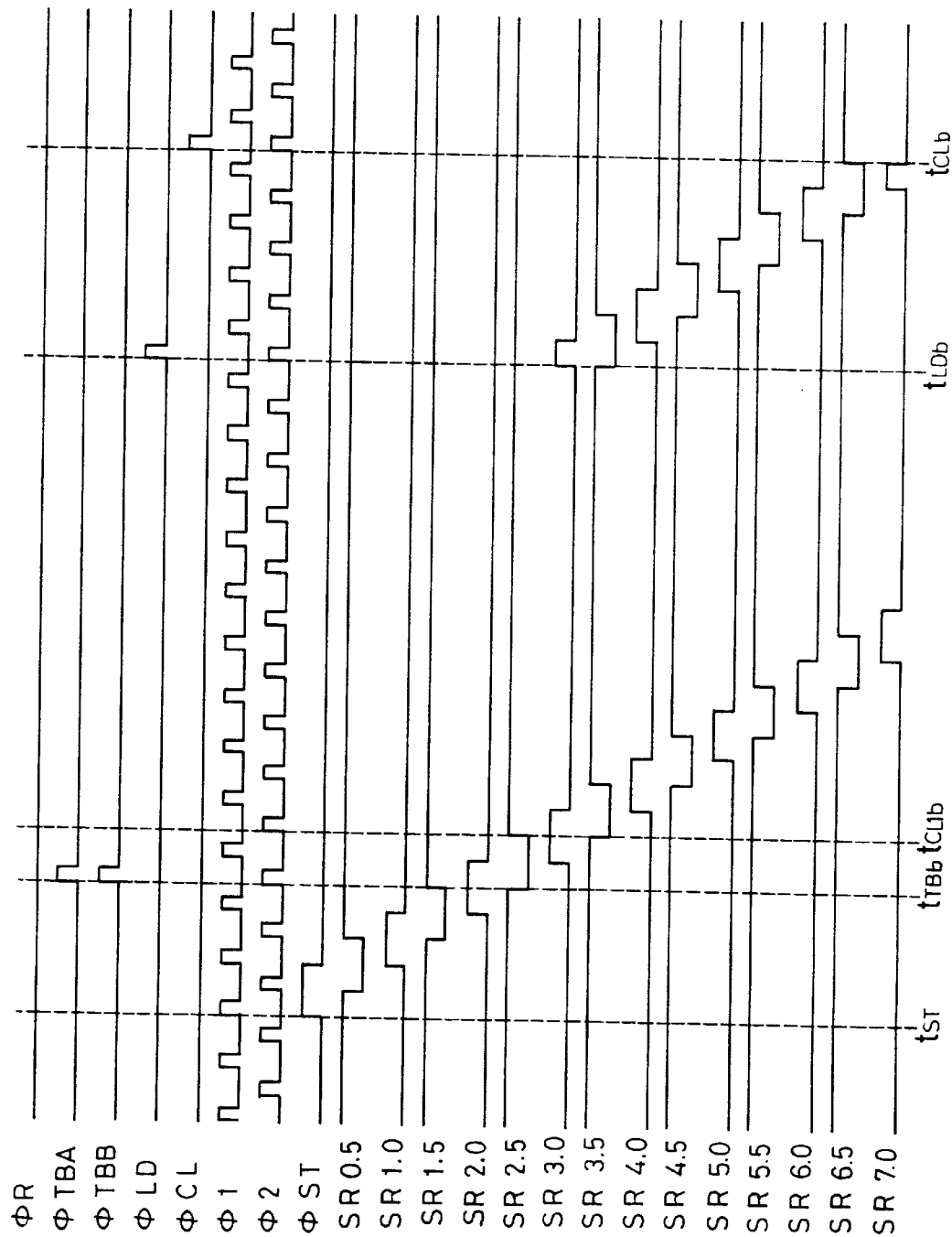
FIG. 9 is a timing diagram illustrating the operation of the scanning circuit of FIG. 8 which outputs a selection signal within an arbitrary scan area.

The operation of this modification is now discussed referring to the timing diagram in FIG. 9. A high level of the start pulse φST having a duration equal to one period of the clock φ1 is fed to the input terminal of the shift register unit 1 at the first unit stage at time $t_{ST}$. At time $t_{TBb}$ afterwards, clocks φTBA and φTBB are driven high level in synchronism with the high level of clock φ2.

This causes the switches 4-4 for latching to be nonconductive and the memory switches 2 to be conductive, and levels (H, L, H and H) at the respective nodes SR 0.5, SR 2.5, SR 4.5, and SR 6.5 are transferred to the input terminals of the respective memory units 4. When clocks φTBA and φTBB turn low afterwards, the memory switches 2 become nonconductive, and the switches 4-4 for latching become conductive. The input terminals of the memory units 4 are isolated from the respective nodes SR 0.5, SR 2.5, SR 4.5, and SR 6.5, data fed to the memory units 4 are latched, and continuously stored there until new data are fed from nodes SR 0.5, SR 2.5, SR 4.5, and SR 6.5 to the respective memory units 4.

At time $t_{LDb}$ afterwards, the clock φLD is driven high level in synchronism with the high level of the clock φ2. The transfer switches 3 become conductive, and data L, H, L, and L, namely inverted forms of data stored in the memory units 4 are transferred to nodes SR 1.0, SR 3.0, SR 5.0, and SR 7.0 at time $t_{TBb}$. After that, shift register operation is performed in synchronism with clocks φ1 and φ2. At time $t_{CLb}$, the clock φCL is driven high level in synchronism with the high level of the clock φ2. This causes the clear switches 7 to be conductive, driving low level the nodes SR 1.0, SR 2.0, SR 3.0, SR 4.0, SR 5.0, SR 6.0, and SR 7.0. In this way, from time $t_{LDb}$ to time $t_{CLb}$, the selection signal is sequentially outputted to nodes SR 4.0, SR 5.0, and SR 6.0.

In the modification shown in FIG. 8, clocks φTBA and φTBB are driven high level at the timing a low level signal appears at any of the nodes SR 0.5, SR 2.5, SR 4.5, and SR 6.5 (node SR 1.5 in FIG. 9) connected to the memory units 4. Data from the memory units 4 can be transferred to nodes SR 1.0, SR 3.0, SR 5.0, and SR 7.0 only. Therefore, the setting of the start position of an arbitrary scan area is limited to one of the nodes SR 2.0, SR 4.0 and SR 6.0. No problem arises in practice even if the scan start position is set to a unit stage out of every several unit stages, because more than a few hundred unit stages are employed in actual solid-state image pickup apparatuses.

As described above, a scanning circuit with even less component count can start scanning at an arbitrarily selected position. By arranging a set of the memory switch 2, transfer switch 3, memory unit 4 and reset switch 5 for every several unit stages in the embodiment 1, the scanning circuit offers the same advantage.

In the modification in FIG. 8, some shift register units are associated with the memory switch and transfer switch, and the others are not. Depending on whether each shift register unit is connected with the memory switch and transfer switch, its load varies. This contributes to variations in the output of the shift register unit. Such variations become severe in particular in the horizontal scanning circuit that is driven at a fast speed.

Figure 10:
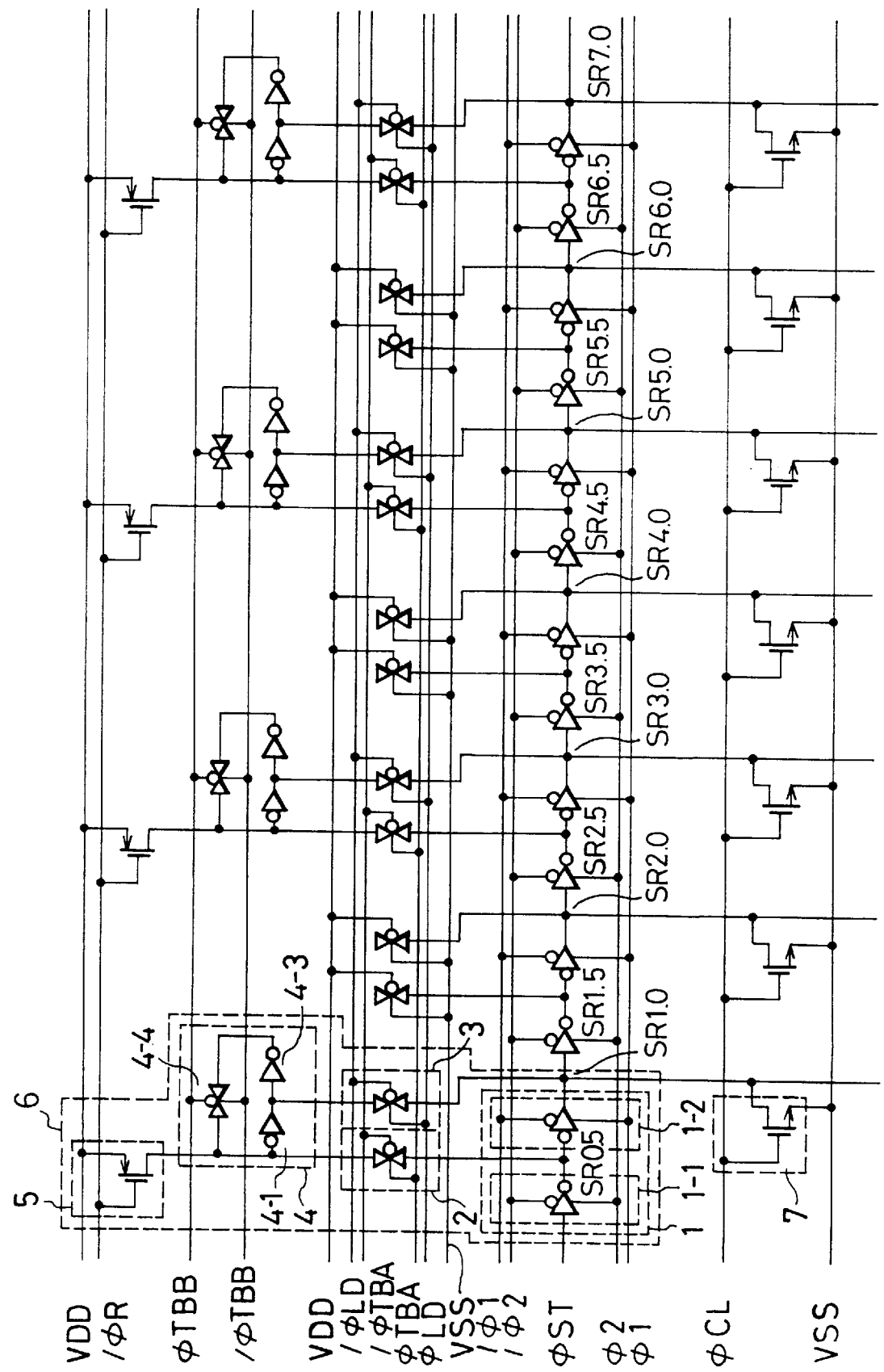
FIG. 10 is a schematic diagram of another modification of the scanning circuit of FIG. 6.

For this reason, a memory switch 2 and transfer switch 3 are arranged on every unit stage, while a memory unit 4 and reset switch 5 are arranged on every two unit stages as shown in FIG. 10. The memory switch 2 and transfer switch 3 on the unit stage having no memory unit 4 associated are configured such that they remain continuously nonconductive. If the memory switch 2 and transfer switch 3 in use are of a type shown in FIG. 3A, they are made nonconductive by connecting the power supply VSS to the gate of the n-channel MOS transistor of analog switch and the power supply VDD to the gate of the p-channel MOS transistor of analog switch. Another modification of the scanning circuit in FIG. 10 operates the same way as the modified scanning circuit in FIG. 8. The shift register units, switches and memory units are not limited to those described herein. Any other components are acceptable as long as they work as equally as those in the embodiment 2 and its modifications.

Figure 11:
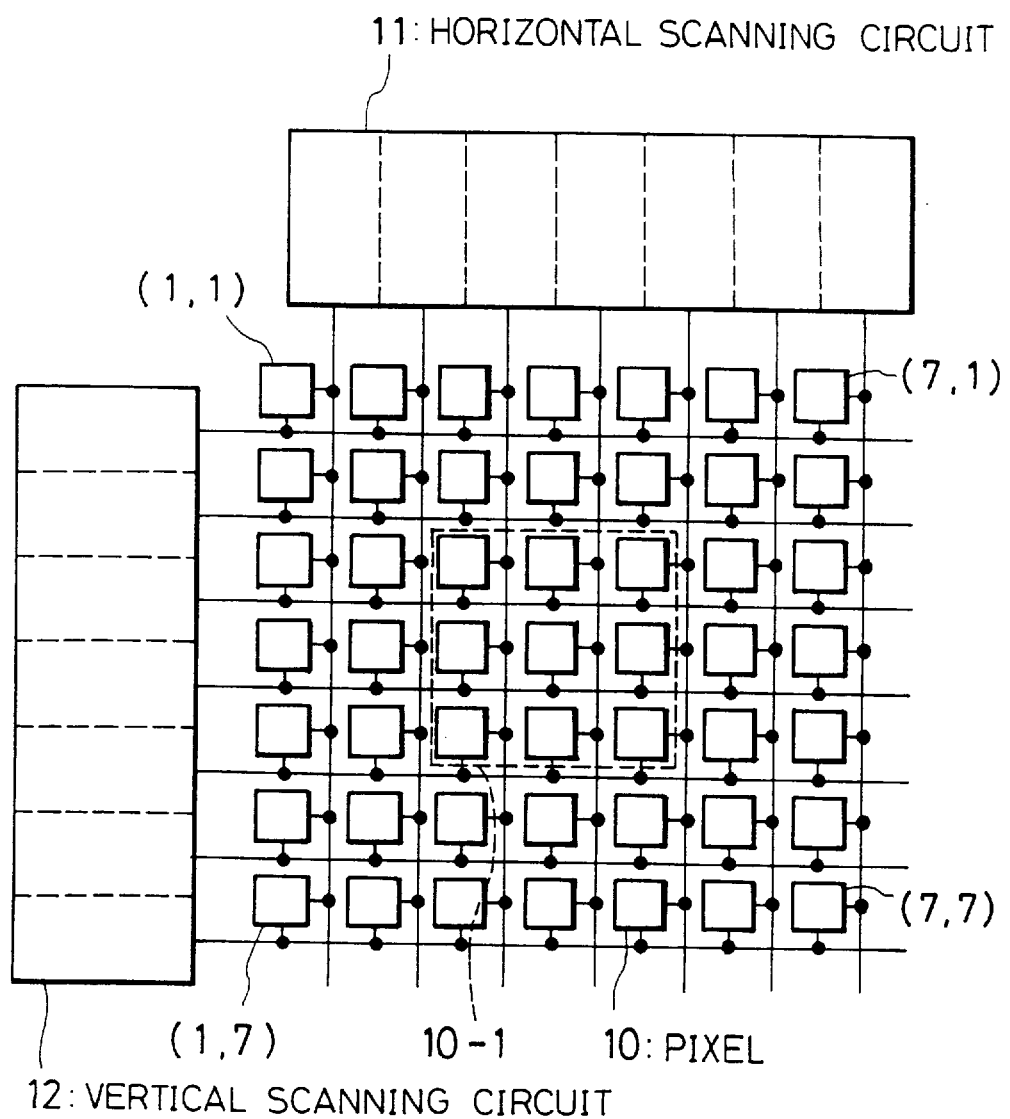
FIG. 11 shows a solid-state image pickup apparatus of an embodiment 3, in which the scanning circuit of embodiment 1 or 2 or of one of their modifications is incorporated.

Discussed referring to FIG. 11 is the embodiment 3, in which the scanning circuit in connection with the embodiment 1 or 2 is incorporated into a solid-state image pickup apparatus. As shown, a pixel array is constructed of pixels 10 which are two-dimensionally arranged in a 7×7 matrix. Designated 10-1 is a group of pixels to be selectively scanned. Let (i, j) represent each pixel, where i denotes a column 1, 2, ..., 7 from left to right, and j denotes a row 1, 2, ..., 7 from top to bottom. A horizontal scanning circuit 11 and vertical scanning circuit 12 incorporate the scanning circuit in the embodiment 1 or 2. The pixels in a row selected by the vertical scanning circuit 12 are sequentially selected by the horizontal scanning circuit, and a pixel simultaneously selected by both scanning circuits is read for signal.

Out of a 7×7 pixel array, a pixel group 10-1 of 3×3 pixels at the center of the array is read as an arbitrary scan area. By driving the shift registers constituting the horizontal and vertical scanning circuits in the method described in the embodiment 1 or 2, the selection signal is output from the shift register units at the third, fourth and fifth unit stages out of the seven unit stages. Therefore, the 3×3 pixels hatched in FIG. 12, out of the 7×7 pixels, are read for signal.

Setting of the scan start position takes time if the frequency of driving clock for pixel readout and the frequency of driving clock for setting of the scan start position are the same. The driving clock of the vertical scanning circuit is lower in frequency than the driving clock of the horizontal scanning circuit. If the same clock frequency is used during both signal readout period and the scan start position setting period, a scan start position setting takes one full frame period at the longest. Regarding the horizontal scanning, one horizontal scanning period at the longest is necessary.

The scan start setting period may be shortened by heightening the frequency of driving clock for setting of the scan start position compared with the frequency of driving clock for pixel readout. This method is particularly advantageous in the vertical scanning circuit. By allowing the horizontal and vertical scanning circuits to perform the scan start position setting during the vertical blanking period, a change of the scan start position is possible in the course of successive frame operation. Once the scan start position is set, no updating is needed until new scan start position is set.

In some cases, charge accumulation time differs between pixels in the scan area that is updated to modify the scan start position. In a non-destructive readout in which only the pixels from which signals have been read are reset to drain accumulated charge, a reset operation is performed on the pixels within the arbitrarily set reading area only. In the new scan area reset by update of the scan start position, there is a mix of pixels that were read before the update and pixels that were not read before the update. This means that the former pixels have underwent the reset operation and that the latter pixels have accumulated charge for a long period of time without undergoing the reset operation. For the first frame period immediately after the scan start position resetting, the mix of pixels is together read to pick up signals as derived from the same frame. Portions with different charge accumulation times within the same frame result in an unnatural-looking image. This is particularly problematic when the scan start position is updated in a continuous imaging operation. For this reason, a masking process is performed in which the signal in an affected frame is not used as a video signal but fram data immediately before the affected frame stored in a video memory is instead output. The update of the scan start position setting is thus performed without any interruption of in the continuous video signal.

The solid-state image pickup apparatus thus constructed picks up signals from pixels within an arbitrary scan area on the entire pickup surface of the apparatus. Although in this embodiment, signal readout is selectively performed on a group of 3×3 pixels out of the 7×7 pixel array, any number of pixels on the entire pickup surface and any number of pixels for selective reading are optionally set.

The embodiment 4 is now discussed. Generally, solid-state image pickup apparatus has a light shielding pixel to make OB (optical black) clamp based on the output from the light shielding pixel as a reference in an effort to acquire a stable output against variations in service environments, such as ambient temperature changes. To carry out OB clamp, an OB pixel (light shielding pixel) to which an incident light is blocked is disposed on the leftmost edge or rightmost edge portion of the effective pixel area, and a signal is read from the OB pixel during the horizontal blanking period or vertical blanking period. In the solid-state image pickup apparatus of the embodiment 3, however, the signal output from the pixels within the arbitrary scan area results in no OB pixel output when no OB pixels are included within the arbitrary scan area. According the embodiment 4, the OB pixel signal is obtained even when signal readout is performed on the arbitrary scan area, and thus a stable OB clamping is performed.

Figure 13:
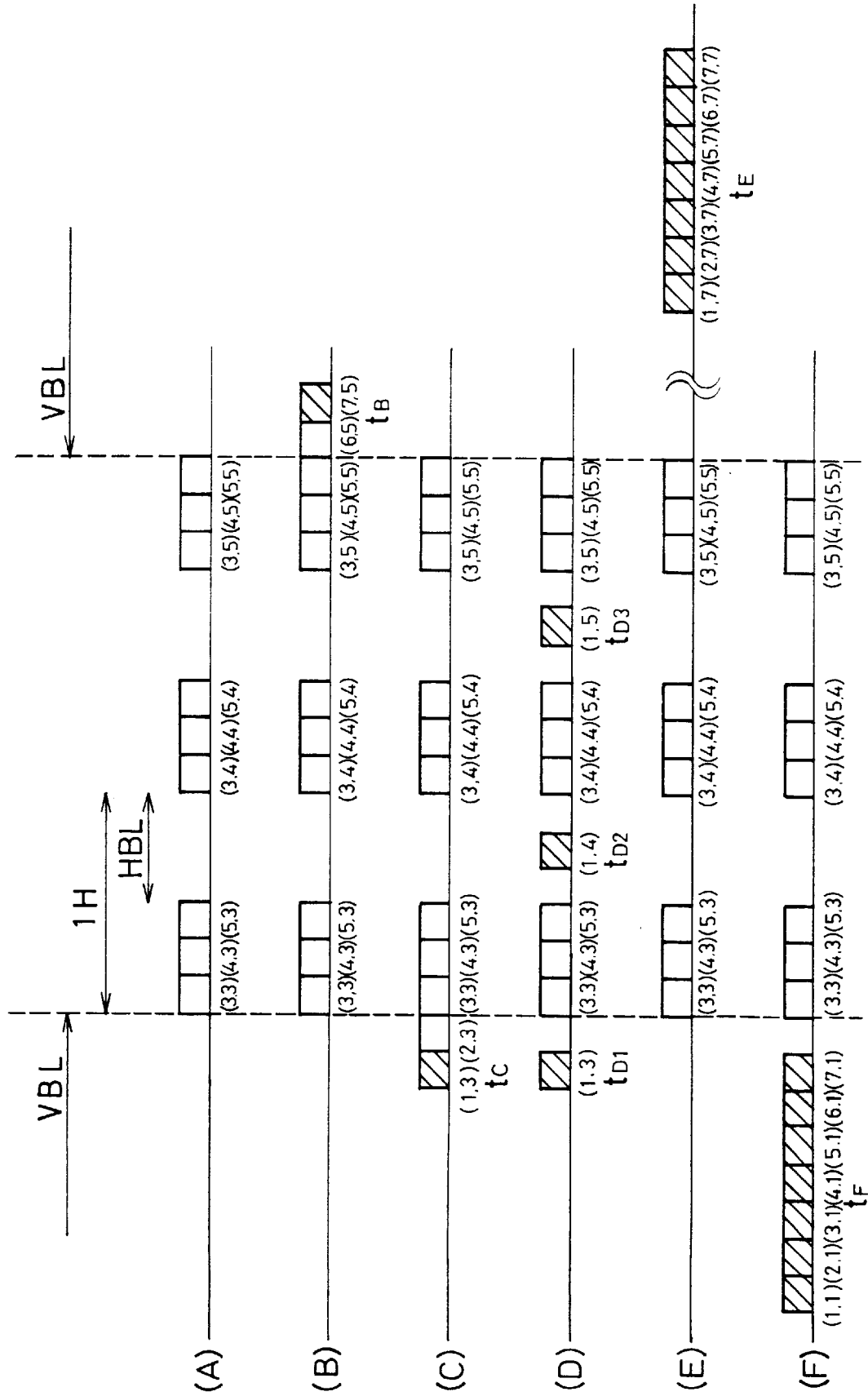
FIG. 13 is a timing diagram of the operation of an embodiment 4, in which OB pixels are read.

Referring to FIG. 13, the embodiment 4 is now discussed. The timing chart (A) of FIG. 13 is the timing diagram of the output signals read from the central 3×3 pixels out of the 7×7 pixels as shown in FIGS. 11 and 12. During signal readout period, the output signals are obtained from pixels i=3~5, j=3~5 out of all pixels (i, j). Since no OB pixels are included within the reading area, no OB pixel signal results. In the discussion that follows, the pixels that are read during the signal readout time are pixels i=3~5, and j=3~5. In FIG. 13, VBL represents the vertical blanking period, HBL the horizontal blanking period, and 1H the horizontal scan period.

The timing chart (B) of FIG. 13 shows the output signals that are obtained in a horizontal scan from the OB pixels at the rightmost edge portion of the effective pixel area of the apparatus. In FIG. 11, pixels in column i=7 are OB pixels. In this embodiment, pixels in rows j=3 and 4 are read, and then pixels all the way from i=3 to i=7 in row j=5 are read. The pixel in column i=7 is an OB pixel, and thus, the output from the OB pixel (i=5, j=7) is obtained at time $t_B$. Readout of pixels in column i=5 thereafter falls within the vertical blanking period VBL. In this embodiment, the OB pixel in row j=5 within the reading area is read. Alternatively, readout may continue to column i=5 in row j=5, followed by scanning the vertical blanking period, then readout may start over in row j=6 from pixel in column i=1 or i=3 and continue to column i=7, with the pixel in i=7 in row j=6 being read as an OB pixel.

The timing chart (C) in FIG. 13 shows the output signals that are obtained in a horizontal scan from the OB pixels at the leftmost edge portion of the effective pixel area of the apparatus. In FIG. 11, pixels in column i=1 are OB pixels. Readout starts with column i=1 in row j=3. Since the pixel in column i=1 is an OB pixel (i=1, j=3), its OB output signal is obtained at time $t_c$. Readout of pixels to column i=2 in row j=3 is included in the vertical blanking period VBL. In this case, readout starts with the OB pixel in row j=3 within the reading area. Alternatively, readout may start with the pixel in column i=3 in row j=3, and in the vertical blanking period, readout may start with the pixel in column i=1 in row j=2 to pick up the OB signal from it.

The timing chart (D) in FIG. 13 shows the output signals that are obtained in a horizontal scan from the OB pixels at the leftmost edge portion of the effective pixel area of the apparatus. In FIG. 11, pixels in column i=1 are OB pixels. During the horizontal blanking period HBL prior to readout of pixels in column i=3~5 in each of the rows j=3~5, pixel in column i=1 in each of the rows is read. Since the pixel in column i=1 in each of the rows is an OB pixel, the OB pixels (1,3), (1,4) and (1,5) are read at times $t_{D1}$, $t_{D2}$ and $t_{D3}$, respectively. After reading all these pixels, the horizontal scan is suspended before the effective horizontal scan starts over to read a group of pixels in columns i=3~5 in rows j=3~5. Midway suspension of the horizontal scan is performed by driving the clock $\phi$CL high level in synchronism with the high level of the clock $\phi$2 in the embodiments 1 and 2. In the above discussion, during the horizontal blanking period HBL prior to signal readout of each of the particular rows, the OB pixel in each of the rows is read. Alternatively, it is perfectly acceptable that the output signal from the OB pixel in the row that has been read during the signal readout time immediately before the horizontal blanking period is used.

The timing chart (E) in FIG. 13 shows the output signals that are obtained in a vertical scan from the OB pixels at the bottom edge portion of the effective pixel area of the apparatus. In FIG. 11, pixels in rows j=7 are OB pixels. After reading a group of pixels in columns i=3~5 in rows j=3~5, a fast vertical scanning is performed, then pixels i=1~7 in row j=7 are read. During this fast vertical scanning, no horizontal scan is performed. The pixels in row j=7 are all OB pixels and the OB signal output are obtained at time $t_E$. It is also acceptable that only pixels i=3~5 in row j=7 are read to pick up the OB signal output.

The timing chart (F) in FIG. 13 shows the output signals that are obtained in a vertical scan from the OB pixels at the top edge portion of the effective pixel area of the apparatus. In FIG. 11, pixels in rows j=1 are OB pixels. Before reading a group of pixels in columns i=3~5 in rows j=3~5, pixels i=1~7 in row j=1 are read. The pixels in row j=1 are all OB pixels and the OB signal output are obtained at time $t_F$. In the above discussion, all OB pixels in column i=1~7 in row j=1 are read to pick up the OB signal. Alternatively, only pixels i=3~5 in row j=1 may be read to pick up the OB signal output.

As described above, in the above embodiment, the OB signal output is obtained and OB clamping is performed even if no OB pixels are included in an arbitrary scan area. In this embodiment, arrays of the OB pixels are arranged on top, bottom, left and right sides of the effective pixel area constructed of non-shade pixels (light receiving pixels), and an array of the OB pixels is read for OB signal output. It is optional to read a plural portion of arrays of the OB pixels in combination. If the OB pixels are arranged in one, two or three of the top, bottom, left and right sides of the light receiving pixels, the OB pixels are read according to the embodiment described above. In this embodiment, a row or a column of OB pixels are arranged around the periphery of the light receiving pixels. It is optional to arrange a plurality of rows or columns of OB pixels around the periphery of the light receiving pixels. In such a case, a plurality of OB pixels or a plurality of rows or columns of OB pixels may be read in a single cycle of readout. The teaching of this embodiment finds application not only in the solid-state image pickup apparatuses in the embodiments 1 and 2, but also in common solid-state image pickup apparatuses that are capable of reading the signal from light receiving pixels within an arbitrarily set area on the pickup surface of the apparatus.

The embodiments 3 and 4 have been described in connection with a two-dimensionally arranged XY address area sensor. It is obvious that the teaching of the present invention can be implemented in a one-dimensional line sensor.

According to the present invention, the memory unit for storing the output of the shift register unit is constructed of a latch, and thus a pixel signal is stably picked up from the same arbitrarily set area for a long period of time. Furthermore, in the readout of the arbitrary pixels, the light shielding pixels are continually read for OB signal output, and thus a stable OB clamp operation is allowed.

What is claimed is:

1. An XY-address solid-state image pickup apparatus comprising a pixel array made up a plurality of pixels two-dimensionally arranged and horizontal and vertical scanning circuits, each scanning circuit having an arbitrary-pixel readout function of reading a pixel signal from an arbitrary area that is a portion of an effective pixel area of the pixel array, said each scanning circuit comprising:

a shift register comprising a plurality of shift register units that are cascaded in a manner that data is transferred therethrough by a clock;

a memory unit constructed of a latch for storing the output of the shift register unit;

a memory switch connected between the shift register unit and an input terminal of the memory unit;

a transfer switch connected between the shift register unit and an output terminal of the memory unit; and switch driving means for driving the memory switch to store data at each shift register unit onto the memory unit associated with said each shift register unit after a shift pulse to be input to the shift register is shifted to the shift register unit at a predetermined position during a scan start position setting period prior to a scan and for driving the transfer switch to start the scan by transferring the data that the memory unit has stored during the scan start position setting period, to the shift register unit with which the memory unit is associated.

2. A solid-state image pickup apparatus according to claim 1, wherein the memory unit, the memory switch and the transfer switch are correspondingly associated with each of said shift register units.

3. A solid-state image pickup apparatus according to claim 1, wherein the memory unit, the memory switch and the transfer switch are correspondingly associated with a shift register unit out of every plurality of shift register units.

4. A solid-state image pickup apparatus according to any of claims 1 through 3 further comprising output means for not using, as a video signal, the signal of a frame that is obtained immediately after a scan start position is updated during a scan start position setting period.

5. A solid-state image pickup apparatus according to claim 4, wherein the signal of the frame immediately after the scan start position is updated during the scan start position setting period is replaced with the video signal of the frame immediately before the scan start position setting period.

6. A solid-state image pickup apparatus according to any of claims 1 through 3, wherein said each scanning circuit drives the shift register faster during the scan start position setting period than during a signal readout time.

7. A solid-state image pickup apparatus according to any of claims 1 through 3, wherein said each scanning circuit forcibly resets a potential in the shift register in succession to the scan start position setting period.

8. A solid-state image pickup apparatus according to any of claims 1 through 3, wherein said each scanning circuit sets the scan start position setting period within a vertical blanking period.

9. A solid-state image pickup apparatus according to any of claims 1 through 3, wherein said pixel array includes light shielding pixels within at least part of the periphery portion of the effective pixel area of the pixel array, and said each scanning circuit reads one or more rows of light shielding pixels prior to or in succession to the readout of the pixel signal in an arbitrary pixel reading.

10. A solid-state image pickup apparatus according to any of claims 1 through 3, wherein said pixel array includes light shielding pixels on the rightmost edge portion of the effective pixel area, and said each scanning circuit performs horizontal scanning in one or more rows to the positions of the light shielding pixels to read a light shielding pixel signal during a vertical blanking period in succession to the completion of the reading of an arbitrary scan area in one frame.

11. A solid-state image pickup apparatus according to any of claims 1 through 3, wherein said pixel array includes light shielding pixels on the leftmost edge portion of the effective pixel area, and said each scanning circuit performs horizontal scanning in one or more rows starting with a head pixel to read a light shielding pixel signal during a vertical blanking period prior to the reading of an arbitrary scan area in one frame.

12. A solid-state image pickup apparatus according to any of claims 1 through 3, wherein said pixel array includes light shielding pixels on the leftmost edge portion of the effective pixel area, and said each scanning circuit performs horizontal scanning in a row to be read or a row that has just been read starting with a head pixel to read a light shielding pixel signal during a horizontal blanking period prior to the reading of arbitrary pixels in one horizontal scan.

13. A solid-state image pickup apparatus according to any of claims 1 through 3, wherein said pixel array includes light shielding pixels on the bottom edge portion of the effective pixel area, and said each scanning circuit performs vertical scanning at a faster speed than normal vertical scan, during a vertical blanking period in succession to the completion of the reading of an arbitrary scan area in one frame, suspends horizontal scanning during a fast vertical scan, and performs horizontal scan in the same manner as a full pixel read mode or an arbitrary pixel read mode when the row of light shielding pixels is selected to read the signal from the light shielding pixels.

14. A solid-state image pickup apparatus according to any of claims 1 through 3, wherein said pixel array includes light shielding pixels on the top edge portion of the effective pixel area, and said each scanning circuit performs vertical scanning to one or more rows starting with a head pixel during a vertical blanking period prior to the reading of an arbitrary scan area in one frame, and performs horizontal scanning in the same manner as a full pixel read mode or an arbitrary pixel read mode to read the signal from the light shielding pixels.

* * * * *